US008838434B1

(12) United States Patent
Liu

(10) Patent No.: US 8,838,434 B1
(45) Date of Patent: Sep. 16, 2014

(54) BOOTSTRAP CALL ROUTER TO OTHER LANGUAGES USING SELECTED N-BEST TRANSLATIONS

(75) Inventor: Ding Liu, Lowell, MA (US)

(73) Assignee: Nuance Communications, Inc., Burlington, MA (US)

( * ) Notice: Subject to any disclaimer, the term of this patent is extended or adjusted under 35 U.S.C. 154(b) by 676 days.

(21) Appl. No.: 13/193,681

(22) Filed: Jul. 29, 2011

(51) Int. Cl.
*G06F 17/28* (2006.01)

(52) U.S. Cl.
USPC ................ 704/2; 704/3; 704/4; 704/6; 704/7; 704/8; 704/251; 704/257; 704/275; 704/277

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC .......................... 704/2–8, 251, 257, 275, 277
See application file for complete search history.

(56) References Cited

U.S. PATENT DOCUMENTS 7,092,888 B1 * 8/2006 McCarthy et al. ............ 704/277
7,349,843 B1 * 3/2008 Beck ............................ 704/231
7,620,538 B2 * 11/2009 Marcu et al. ...................... 704/2
8,234,106 B2 * 7/2012 Marcu et al. ...................... 704/2
8,296,127 B2 * 10/2012 Marcu et al. ...................... 704/5
8,407,041 B2 * 3/2013 Deng et al. ........................ 704/2
8,433,556 B2 * 4/2013 Fraser et al. ...................... 704/4
8,515,736 B1 * 8/2013 Duta ................................ 704/9
2003/0004717 A1 * 1/2003 Strom et al. .................. 704/240
2003/0061029 A1 * 3/2003 Shaket .............................. 704/9
2003/0187644 A1 * 10/2003 Mohri et al. .................. 704/256
2004/0181390 A1 * 9/2004 Manson ............................ 704/2
2007/0043567 A1 * 2/2007 Gao et al. ...................... 704/257
2007/0271088 A1 * 11/2007 Waibel et al. ..................... 704/9
2008/0033720 A1 * 2/2008 Kankar et al. ................ 704/235
2008/0077386 A1 * 3/2008 Gao et al. .......................... 704/3
2008/0133245 A1 * 6/2008 Proulx et al. .................. 704/277
2008/0228484 A1 * 9/2008 Gao et al. ...................... 704/251
2009/0055164 A1 * 2/2009 Hu et al. ........................... 704/9
2009/0055176 A1 * 2/2009 Hu et al. ....................... 704/240
2009/0248422 A1 * 10/2009 Li et al. ......................... 704/277
2009/0299724 A1 * 12/2009 Deng et al. ........................ 704/2
2009/0326912 A1 * 12/2009 Ueffing ............................. 704/2
2010/0023331 A1 * 1/2010 Duta et al. .................... 704/257

(Continued)

*Primary Examiner* — Lamont Spooner
(74) *Attorney, Agent, or Firm* — Hamilton, Brook, Smith & Reynolds, P.C.

(57) ABSTRACT

Techniques disclosed herein include systems and methods for creating a bootstrap call router for other languages by using selected N-best translations. Techniques include using N-best translations from a machine translation system so as to increase a possibility that desired keywords in a target language are covered in the machine translation output. A 1-best translation is added to a new text corpus. This is followed by selecting a subset that provides a varied set of translations for a given source transcribed utterance for better translation coverage. Additional translations are added to the new text corpus based on a measure of possible translations having words not yet seen for the selected transcribed utterances, and also based on possible translation having words that are not associated with very many or semantic tags in the new text corpus. Candidate translations can be selected from a window of N-best translations calculated based on machine translation accuracy.

20 Claims, 6 Drawing Sheets

(56) References Cited

U.S. PATENT DOCUMENTS

| | | | | |
|---|---|---|---|---|
| 2010/0030723 | A1 * | 2/2010 | Au | 706/55 |
| 2010/0161317 | A1 * | 6/2010 | Au | 704/9 |
| 2010/0179803 | A1 * | 7/2010 | Sawaf et al. | 704/2 |
| 2010/0204978 | A1 * | 8/2010 | Gao et al. | 704/2 |
| 2010/0268536 | A1 * | 10/2010 | Suendermann et al. | 704/243 |
| 2011/0022381 | A1 * | 1/2011 | Gao et al. | 704/7 |
| 2011/0301935 | A1 * | 12/2011 | Quirk et al. | 704/2 |
| 2012/0143591 | A1 * | 6/2012 | Deng et al. | 704/2 |
| 2012/0158399 | A1 * | 6/2012 | Tremblay et al. | 704/9 |
| 2012/0166183 | A1 * | 6/2012 | Suendermann et al. | 704/9 |

* cited by examiner

200 – Main Selection Algorithm

```
nbest(e): sorted n-best translations for source sentence e
Select the 1-best translation from MT output, and add it to NewTransSet;
update(NewTransSet);
for i = 2, ..., N
    NewTransSet = {}
    foreach source sentence e
        best=-1;
        foreach f in nbest(e)
            break if (in_window(f, e) == false);
            score = evaluate(f, e)
            if score > best
                best=score;
                best_trans = f;
        if best > 0
            remove best_trans from nbest(e);
            add f to e.selected_translation;
            add (e, best_trans) to NewTransSet;
update(NewTransSet);
```

210 – Function evaluate

```
f: input translation
e: input source sentence
res = 0;
foreach word w in f
    if w is not in TargetWordSet[e]
        res += (1 – RelatedRouteSet[w].size/TotalRouteNum)
return res;
```

220 – Function update

```
NewTransSet: input source sentence and its new translation set
f.score: f's score based on MT engine
f.rank: f's position in the nbest list
e.route: routing tag for source sentence e
e.bottom: the worst selected translation so far
foreach pair (e, f) in NewTransSet
    if f.score < e.bottom.score
        e.bottom = f;
    foreach word w in f
        if e.route is not in RelatedRouteSet[w]
            add e.route to RelatedRouteSet[w];
        add w to TargetWordSet[e]
```

230 – Function in-window

```
f: input translation
e: input source sentence
if f.score >= e.bottom.score – window.score AND
f.rank <= e.bottom.rank + window.size
    return true;
else return false;
```

*FIG. 2*

BOOTSTRAP CALL ROUTER TO OTHER LANGUAGES USING SELECTED N-BEST TRANSLATIONS

BACKGROUND

The present disclosure relates to call routers, speech recognition, text classification, and training of call routing systems.

Spoken language understanding systems have been deployed in numerous applications that involve interaction between humans and machines. Such systems typically operate by processing spoken utterances from a human to identify intended meaning of questions or answers uttered by the human. By correctly identifying an intended meaning of a spoken utterance, the system can execute various actions in response to that utterance, for use with various applications. For example, such actions can include performing mechanical operations, operating a computer, controlling a car audio/navigation system, or routing a telephone call to an appropriate area or agent.

One particular class of applications employs Natural Language Understanding (NLU) technology as a type of semantic classification known as "call routing." Call routing applications involve semantically classifying a telephone query or statement from a caller to route the telephone call to an appropriate agent (real or automated) or to a location within the call routing system. Such routing, for example, can be based on a brief spoken description of the caller's reason for the telephone call. Call routing systems reduce queue time and call duration, thereby saving money and improving customer satisfaction by promptly connecting a given caller to a correct service representative, such as in large call centers.

Call routing applications classify spoken inputs or utterances into a small set of categories for a particular application. For example, the spoken inputs, "I have a problem with my bill," "Check my balance," and "Did you get my payment?" might all be mapped to a "Billing" category, or each might be mapped to one of several subcategories within a broader billing category. Since people express spoken requests and queries in many different ways, call routers are typically implemented as a statistical classifier that is trained on a labeled or tagged set of spoken requests and their corresponding classifications.

Determining a semantic tag or classification for a human utterance in a call routing system typically involves converting input speech from a speaker into a text string by an automated speech recognition (ASR) module or system (also known as a speech recognizer). This text string generated by the speech recognizer is output into an NLU semantic classifier known as a statistical router. The statistical router models the task of natural language understanding as a statistical classification problem in which the text string corresponding to the human utterance is assigned to one or more of a set of predefined user intents, referred to as "call routes," as part of a route ordering/reordering process. The route ordering process can also receive a confidence level of assigned routes. The call router can then execute a routing decision. The routing decision can be based on thresholds corresponding to confidence levels of assigned routes. Various specific classifiers can have high levels of classification accuracy.

SUMMARY

Creating a new call router is a training process. This training process typically involves acquiring a new set of training data (utterances in text form) based on specific needs of the new call router, or needs of an entity requesting the new call router. This training process is typically an expensive and slow process because a large labeled training corpus must be collected and developed for each new application to create an application with acceptable classification accuracy. Such collection and development is usually a manual process. This collection and development process (offline training process) can involve human/manual transcription or human-reviewed transcription of a set of recorded utterances, such as recorded queries from calls received at a particular call center. The human transcriber/reviewer then annotates recorded utterances with their semantic classes to create a set of semantic tags. That is, the human transcriber identifies what was said, and what class to assign. After offline training of the call routing classifier on the training data, the call router can be implemented in the application to process live, unlabeled, incoming utterances from real callers of an online call routing application.

One challenge with creating a new call router is generating a corpus of utterances for training. Existing call centers for a given entity may have recorded a relatively large number of caller queries, but this is not always the case. Also, there exists a need to create call routers in foreign natural languages where no training data has been collected, but where there may exist a functioning call router in a domestic language or other different foreign language. Taking the time to collect human utterances in a foreign language can be too time consuming and expensive for certain entities.

One solution is to automatically translate training data from a first language for use in a second or foreign language using machine translation (MT) technologies. For example, a given entity already has an existing and functioning call router that processes spoken utterances from English language speakers, and desires to use that same call router to process spoken utterances in French or Spanish. A major challenge in using Machine Translation technologies to convert a call router from one language to another is accuracy. For example, one word in language A could be translated to many different words in language B. Due to the difference in word distribution of a corpus used to train the machine translation system, and a true word distribution in a target routing corpus, using a top translation (or top translations) generated by the machine translation system might not be the best for training a call router.

Techniques disclosed herein include systems and methods for creating a bootstrap call router for other languages by using selected N-best translations. Techniques include using N-best translations from a machine translation system so as to increase a possibility that desired keywords in a target language are covered in the machine translation output. Unfortunately, excessive use of N-best translations can result in many repeated words, which can lead to a big drop in training data translation accuracy. To max the potential of using N-best translations while still keeping the expansion safe, techniques disclosed herein select a sub-set of translations out of the N-best. The selected subset provides a more varied or different set of translations for a given source transcribed utterance for better translation coverage.

The system can include a two-phase selection process. The first phase is a fixed selection process. The top output (possible translations of a source transcribed utterance) from a machine translation system is selected, and the statistics of the target words in each selected transcribed utterance and routes are computed. The second phase involves a greedy selection phase that makes optimal choices to select and collect a subset of possible translations. During the second phase evaluation, a given possible translation is judged to be good if the possible translation has words not yet seen for the selected sentences, those words are not associated with very many routes or semantic tags (they are salient), and candidate possible translations appear within a dynamic window decided by the selected translations so far. Thus, the second phase involves selecting the N-best translation, in a dynamic window, that adds the most saliency-weighted words to the foreign language training data. At the end of each iteration, the statistics of target words in each selected transcribed utterance and corresponding routes are updated.

One embodiment includes a training data manager that executes a training data generation process or a training data generation system. The training data generator accesses a first text corpus. The first text corpus can include transcribed utterances that have been transcribed from spoken queries spoken in a first natural language. Each transcribed utterance is linked to a semantic tag that a first speech recognition call router uses to route telephone calls. The training data generator translates the transcribed utterances from the first natural language to a second natural language via a machine translation process. This machine translation process generates an N-best list of possible translations for each transcribed utterance input through the machine translation process. Each possible translation has a machine translation score that indicates a probability of being a correct translation. Each possible translation is also linked to a semantic tag from a corresponding transcribed utterance, that is, from the first call router. From each N-best list, the training data generator selects a 1-best possible translation and adds the 1-best translation to a second text corpus. Each selected 1-best translation has a highest machine translation score as compared to machine translation scores of other possible translations within a respective N-best list, that is, according to a ranking.

From each N-best list, the training data generator selects a second possible translation and adds the second possible translation to the second text corpus. Each selected second possible translation is selected based on a measure of individual words from each possible translation that match individual words from at least one possible translation that has been added to the second text corpus and that has been selected from a same N-best list. In one configuration, possible translations are weighted higher for selection when containing words not found in transcribed utterances already selected for a particular route. After selecting such optimal possible translations, a second speech recognition call router can be trained using the second text corpus. The second speech recognition call router is configured to recognize spoken queries that are spoken in the second natural language. The second speech recognition call router uses a speech classification system based on the first speech recognition call router.

In other embodiments, the training data generator bases selection of the second possible translation, and additional possible translations on an evaluation of individual words from each possible translation as compared to a measure of matching individual words from the second text corpus being linked to different semantic tags. For individual words found in relatively fewer routes/semantic tags, corresponding possible translations can be weighted or scored higher for selection for the second text corpus. In other embodiments, possible translations considered for selection to be added to the second text corpus can be found within a window or subset of ranked possible translations. This subset includes possible translations within a predetermined ratio of accuracy computed based on at least one possible translation that has been added to the second text corpus and that has been selected from the same N-best list. Such a subset can limit evaluation to a given window of accuracy, such as being based on machine translation accuracy.

Such techniques generate a corpus of training data that is both accurate and varied, thereby providing excellent training data for a call router in a second natural language, without the time an expense of collecting and processing spoken utterances from native speakers of the second natural language.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: accessing a first text corpus, the first text corpus including transcribed utterances that have been transcribed from spoken queries spoken in a first natural language, each transcribed utterance linked to a semantic tag that a first speech recognition call router uses to route telephone calls; translating the transcribed utterances from the first natural language to a second natural language via a machine translation process, the machine translation process generating an N-best list of possible translations for each transcribed utterance that is processed by the machine translation process, each possible translation having a machine translation score that indicates a probability of being a correct translation, each possible translation being linked to a semantic tag from a corresponding transcribed utterance; from each N-best list, selecting a 1-best possible translation and adding the 1-best translation to a second text corpus, each selected 1-best translation having a highest machine translation score as compared to machine translation scores of other possible translations within a respective N-best list; from each N-best list, selecting a second possible translation and adding the second possible translation to the second text corpus, each selected second possible translation being selected based on a measure of individual words from each possible translation that match individual words from at least one possible translation that has been added to the second text corpus and that has been selected from a same N-best list; and training a second speech recognition call router using the second text corpus, the second speech recognition call router configured to recognize spoken queries that are spoken in the second natural language, the second speech recognition call router using a speech classification system based on the first speech recognition call router. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting call routing applications and classification systems. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 2 is example pseudocode for a software application executing training data generation according to embodiments herein.

DETAILED DESCRIPTION

Techniques disclosed herein include systems and methods for creating a bootstrap call router for other languages by using selected N-best translations. Techniques include using N-best translations from a machine translation system so as to increase a possibility that desired keywords in a target language are covered in the machine translation output. Unfortunately, excessive use of N-best translations can result in many repeated words, which can lead to a big drop in training data translation accuracy or call router performance accuracy. To max the potential of using N-best translations while still keeping the expansion safe, techniques disclosed herein select a sub-set of translations out of the N-best translations. The selected subset provides a more varied or different set of translations for a given source transcribed utterance.

Such techniques can at least address a problem of lack of training data in another language. For example, there may exist a particular English-based call router or call routing system and this system is desired to be converted for use in a different language, such as French, Spanish, etc. By way of a more specific example, a large bank may have customers in English and Spanish, but currently has only uses an English-based call router. This large bank desires to provide such Spanish speaking customers with a native language interface. In such a scenario where a company or organization wants to expand to a different language, the call routes or classification system will most likely remain the same (with some slight modification), and thus conversion for use in a second language is a matter of correct language translation—especially the translation of training data.

Manual translation can be time consuming and expensive. Machine translation technologies provide a faster and more economical approach to language translation. Conventional machine translation typically involves use of computer software to translate text or speech from one natural language to another natural language, such as by using word substitution and statistical-based word selection. One significant challenge with machine translation, however, is that machine translation is not 100% accurate. Notwithstanding, even if machine translation were 100% accurate, simply having a one-best translation or top best translations is not going to cover all of the various ways of saying the same thing in the second language. By way of a non-limiting example, various callers who call to find information about their checking account can request such information by speaking many different queries. For example, there could be a significant variation in word choice and sentence structure of queries from various different people. Thus, having only a single transcribed utterance for each semantic tag will not be sufficient to accurately train a call router.

Figure 1:
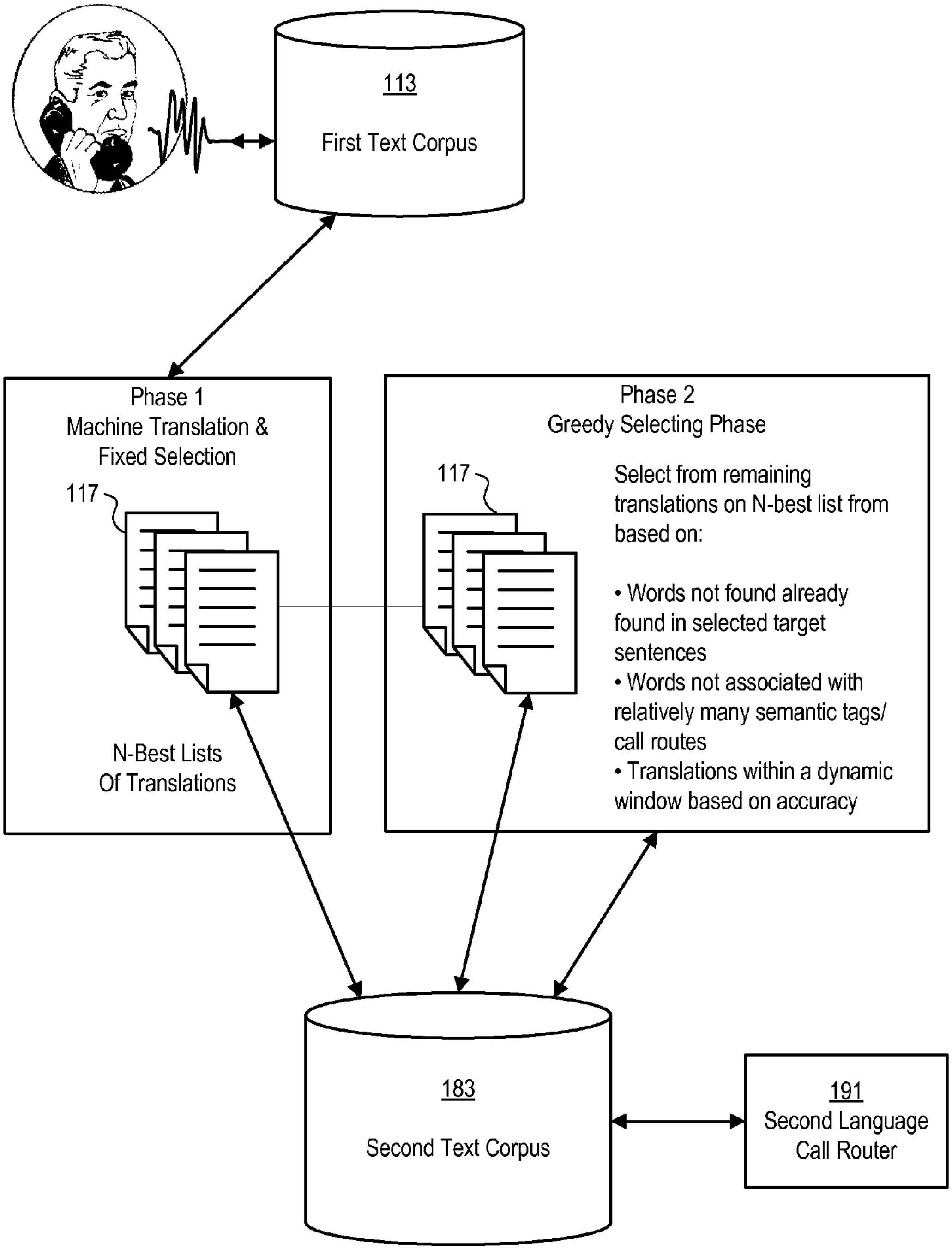
FIG. 1 is a block diagram of a system for training data generation from existing training data according to embodiments herein.

Referring now to FIG. 1, a block diagram illustrates a general architecture of the system and process. This process can yield a machine translation bootstrap call router to create a call router for a second language. This bootstrap call router can then function either as a temporary call router until a sufficiently large corpus of recorded native utterances from the second language has been collected, so that the bootstrap call router can be gradually replaced with a call router trained on native utterances (new data) of the second language. Alternatively, the bootstrap router can serve as a permanent call router, having a satisfactory level of accuracy.

Existing call routing data found in a first text corpus 113 from a first language (such as English) is accessed. This data is also known as training data. This training data has been used to train a first call router classification system, and thus the training data includes a tag corresponding to each transcribed English utterance. That is, each transcribed utterance is associated with, or linked to, a specific call route. For example, one utterance might be "I want to check my balance", which has a corresponding tag or classification of "Check Balance." This example utterance can have variations of saying the same thing. Utterance variations might include "I would like to check my balance," "I need to know my balance," "how much money is in my checking account," and so forth. These variations would have the same tag/classification of "Check Balance". Thus, these and other possible utterances or ways of saying the same thing will have this same tag.

The system then uses machine translation to translate transcribed utterances from the training data to a second language, such as French. This is Phase 1 of the training data generator process. Each respective French translation will then be tagged or linked to the same call routing classifier that corresponds to the source transcribed English utterance. By translating all transcribed utterances from the training data of the first language into tagged translations of the second language, a second text corpus 183 for the second language can be created and begin to receive translated training data for eventual use in training a second language call router 191. There are challenges for such an approach because a given word in the first language can be translated to one or more words in the second language. In addition to challenges with word choice for machine translations, there are also challenges with respect to word order or word arrangement. For example, even with an accurate foreign language translation, this accurate foreign language translation might not actually represent the way a foreign speaker would phrase a query of the same meaning. In other words, a given machine translation may make sense (is understandable) to a foreign speaker, but the translation is nevertheless different than the way foreign speakers typically make a query having the same meaning. In other words, it is not said the same way. Thus, there can be a mismatch of training data translations and what foreign-language speakers actually speak in the foreign-language.

Machine translation systems can be configured to return a list of N-best translations 117, which can be a ranked list. For example, this could be the top 10 translations or the top 100 translations, etc. Typically, the top translations will be very similar to each other (little variation in word choice and structure). For example, the second best translation may be very similar to the first best translation thereby receiving a relatively high score of estimated accuracy, as estimated by the machine translation system itself. Limiting selection to, for example, the top 10 translations can result in a lot of redundant words. Note that typically with shorter transcribed utterances, there are fewer potential foreign language translations, whereas with longer transcribed utterances, there tends to be a greater number of potential foreign language translations.

In practice, better performance results can often be obtained using, approximately, the top 100 translations. Such a large list of potential translations, however, can also introduce additional challenges. For example, if the existing call router already has a relatively large corpus of training data, then multiplying the number of transcribed utterances in the corpus of training data by 100 translations per transcribed utterance can significantly slow the training process of developing a call router for the second language.

In the first phase, the system selects the top translations via the machine translation system. A given machine translation system can return an ordered list of translations, from the best to the worst. The machine translation system attaches a ranking or score to each respective translation variation. This score is a representation of accuracy for each respective translation. In other words, each score can indicate or otherwise represent a level of confidence or probability of being a correct translation as determined by the machine translation system itself. An operator of the machine translation system can request any number of possible translations to be generated or returned for each transcribed utterance. Nevertheless, regardless of whether an operator requests the top 10 translations or the top 100 translations, the top 1-best translation will be the same. In the first phase a top or best translation is selected for each N-best list.

Because the source transcribed utterance, that is the transcribed utterance from the first language, has already been classified by the existing call router, the classification or semantic tag is already known. That tag can then be transferred to the translated transcribed utterance identified as the best translation. This 1-best translation is now associated with, or linked to, an existing call routing semantic tag. Likewise, the subsequent translations in the ordered list of translations are also associated with that same call routing semantic tag.

After the 1-best selection, the system transitions to Phase 2 and computes how many words occur in different semantic tags in the second text corpus 183. That is, the training data generator can index data added to the second text corpus 183 for Phase 2 evaluations. In Phase 2, the system selects translations based on statistics computed up to that point. Such statistics can include computing word salience. Word salience represents for each word how many semantic tag occurrences exist. In other words, salience can represent or indicate a frequency of a given word occurring in various semantic tags based on the foreign-language translations in the second text corpus. In yet other words, salience indicates how many semantic tags a given word maps to in the selected translations. Note that word salience generally relates to individual word occurrences instead of phrase or sentence occurrences, although other embodiments can incorporate phrase occurrences as well. The system can count how many routes have a particular word, which is distinct from counting how many times a particular word occurs in a given route. Accordingly, the system can identify words that do not occur in many routes as a measure of salience in that words found in fewer routes have a higher salience value or weight.

Phase 2 includes a translation selection process that provides more varied or different translations for a given source transcribed utterance. Thus, the system avoids selecting sentences having words already seen in the one best translation for that source sentence.

For example, using the example transcribed utterance "I want to check my balance" as a source transcribed utterance, the machine translation system can generate an ordered list of possible foreign-language translations. For this specific example, consider that the foreign language is French. In the course of translation processing, the machine translation system identifies five different possible translations for the word "balance", which can be identified as word-A, word-B, word-C, word-D, and word-E. Consider that in the top five translations, the machine translation system uses word-A, and not until the sixth best translation does the machine translation system use word-B in a possible translation. Accordingly, after the 1-best translation is selected for use in the foreign-language training corpus, translations two through five might be passed over during Phase 2 evaluation, such that the next translation to be selected for use in the second text corpus is the sixth translation, thereby providing a variation in selected translations. In other words, a word appearing less-often is suggestive of an alternative word for the same meaning—a good variation.

In Phase 1 the system selects the 1-best translation, and in Phase 2, the system computes a score for each candidate translation, and selects a next best translation based on this score. The next selected translation may or may not be the next ranked translation according to machine translation scores. Simply selecting the top 10 translations based only on the machine translation scores would result in a high level of redundancy, that is, redundant translations. Instead of simply using the machine translation scores for translation selection, the training data generator computes an additional score based on secondary criteria and statistics generated after Phase 1 selection.

In phase 2, after each selection of an additional translation to add to the second text corpus, the statistics can be dynamically updated. Each selection run can select one translation for each source transcribed utterance. In other embodiments, the system can select a predetermined number of translations for each source transcribed utterance, though the system is typically more effective by selecting one additional translation for each source transcribed utterance, updating statistics, and then cycling through each N-best list to again evaluate possible translations and select an additional possible translation to add to the second text corpus. A phase-2 score, or variation score (salience score), can by computed by evaluating each word in a given possible translation. The system can exclude from consideration words already seen in selected translations to this point for each source transcribed utterance.

The Phase 2 variation evaluation can be limited to considering only candidate translations defined by a window (which may exclude some translations already evaluated). By considering all translations in the N-best list, the result could be some out-of-place translations. The machine translation system typically ranks the generated translations based on one measure of accuracy, but not on variation. Although two given translations in an N-best list may appear next each other in the ranking, the level of confidence of those two translations could differ substantially. Having a window or subset of translations to consider as a means of restricting the translation selection range can help prevent a level of variation that would decrease performance of the second call router.

The statistical window can be based on the ranking of the machine translation, and/or be based on translations that have already been selected so far. For example, in Phase 1 the top translation is selected, and that translation can be used as a reference to create a window. Thus additional candidate translations will not be significantly worse than this top translation. And this translation can be designated as the worst translation that has been selected so far (it is also the best translation selected so far). Thus, this translation will be used as a reference to create the window. The window can be base on several factors. One factor is the translation scores from the machine translation system will not be worse than the translation score of the 1-best translation that was selected, multiplied by some ratio. For example the score of the translation candidate under consideration must be greater than a predetermined ratio multiplied by the machine translation score of the selected translation currently designated as the "worst" selected translation. Another factor is size. For example, the rank of a translation candidate under consideration must be higher that a predetermined size plus a rank of the currently worst selected translation, or simply based on a predetermined size. This can result in a sliding window.

After each additional translation selection to be added to the second text corpus, the system can update the worst designated translation. After Phase 1, the bottom translation is the 1-best translation. After the second round of selection, for example, the system may select the third best translation, which then becomes the designated worst translation for subsequent window selection.

As long as a candidate translation has a score within the window, then that candidate translation will be evaluated for possible selection based on an evaluation of word salience and salience of a translation. "Word Salience" refers to an inverse of the number of routes associated with a word, as a means of identifying words not associated with relatively many routes. "Salience of a translation" refers to an accumulated salience of words that do not appear in the selected translations of the source sentence/transcribed utterance. Thus, if a candidate translation has few words already appearing in selected translations in the second corpus—corresponding to the same semantic tag/source transcribed utterance—then that candidate translation will have a higher salience of translation score. Salience can be computed by excluding those words that have already been seen in the selected translation(s) of the source transcribed utterance. Any words that have only appeared once so far will have a higher score, while words that have appeared in previous translations will have a lower score, or will not have a score at all.

Words within a given candidate translation are evaluated against the statistics up to that point. Thus, the statistics can be regularly updated based on the entire selected translations. Updating can happen before a subsequent selection for evaluation.

The training data generator can then repeat this process for every source language transcribed utterance in the training corpus. Each candidate translation gets a score based on a salience evaluation. Note that in practice, the system can select a single translation per round from each N-best list to add to the second text corpus, instead of selecting several or many translations for each source transcribed utterance before moving on to selecting more translations for a second source transcribed utterance. Thus, selecting one translation per source transcribed utterance per round typically provides better results, especially with respect to Word salience. The system, however, can repeat the process depending upon how many translation variations are desired for each source transcribed utterance (such as 5, 10, or 20 per source transcribed utterance).

A number of candidate translations ultimately selected for use in the bootstrap call router for each source transcribed utterance depends on the window. The window can be a sliding window or a fixed window. Alternatively, a window size can have a hard constraint which can be a number limiting the total amount of candidate translation selected for the bootstrap system. For example, a window could have a hard constraint of 10, which means that anywhere from one to 10 candidate translations would ultimately be considered for adding to the second language training corpus. For the salience evaluation, the system simply selects the best candidate translation, as long as that candidate translation falls within the window.

The ultimate selection of translations for the second text corpus may not coincide with the machine translation rankings. By way of a non-limiting example, the machine translation system generates a list of 100 best translations. Of those 100 best translations, the five best translations based on saliency are desired. Using a machine translation selection only, the top five best translations would simply be the translations ranked numbers one to number five. With the techniques disclosed herein, however, based on an additional saliency evaluation, the final selected five best translations may be scattered throughout the 100 best machine translation ranked list. For example, the system may ultimately select translations number one, number seven, number 16, number 28, and number 41.

These ultimately selected translations are the most saliency-weighted words within a specific window of machine translation accuracy. While embodiments can omit the dynamic window, selection results without the dynamic window have a possibility of resulting in translations perceived as odd or weird by a human reviewer.

Referring now to FIG. 2, example pseudocode is shown for an example embodiment as described herein. The example pseudocode includes a main selection algorithm 200, and references sub process functions including Evaluate 210, Update 220, and In-window 230. The main selection algorithm shows creating an N-best list of translations for a source English sentence, selecting the 1-best translation, and adding this to a new translation set, followed by updating statistics for the new translation set.

As seen in the update function 220, updating statistics involves considering machine translation scores, N-best list ranking, routing tags for source sentences, and noting word salience and salience of translations. The in-window function 230 shows an example computation of a dynamic window based on score ratios and window size. The evaluate function 210 shows an example computation for determining both word salience and salience of translations. Returning to the main selection algorithm, the training data generator evaluates possible translations if found within a dynamic window. The evaluation is based on word salience (route-based) and salience of translations to assign a salience score in addition to the machine translation score, as part of the selection process to select a next best translation from each N-best list to add to the new translation set (second text corpus).

Figure 5:
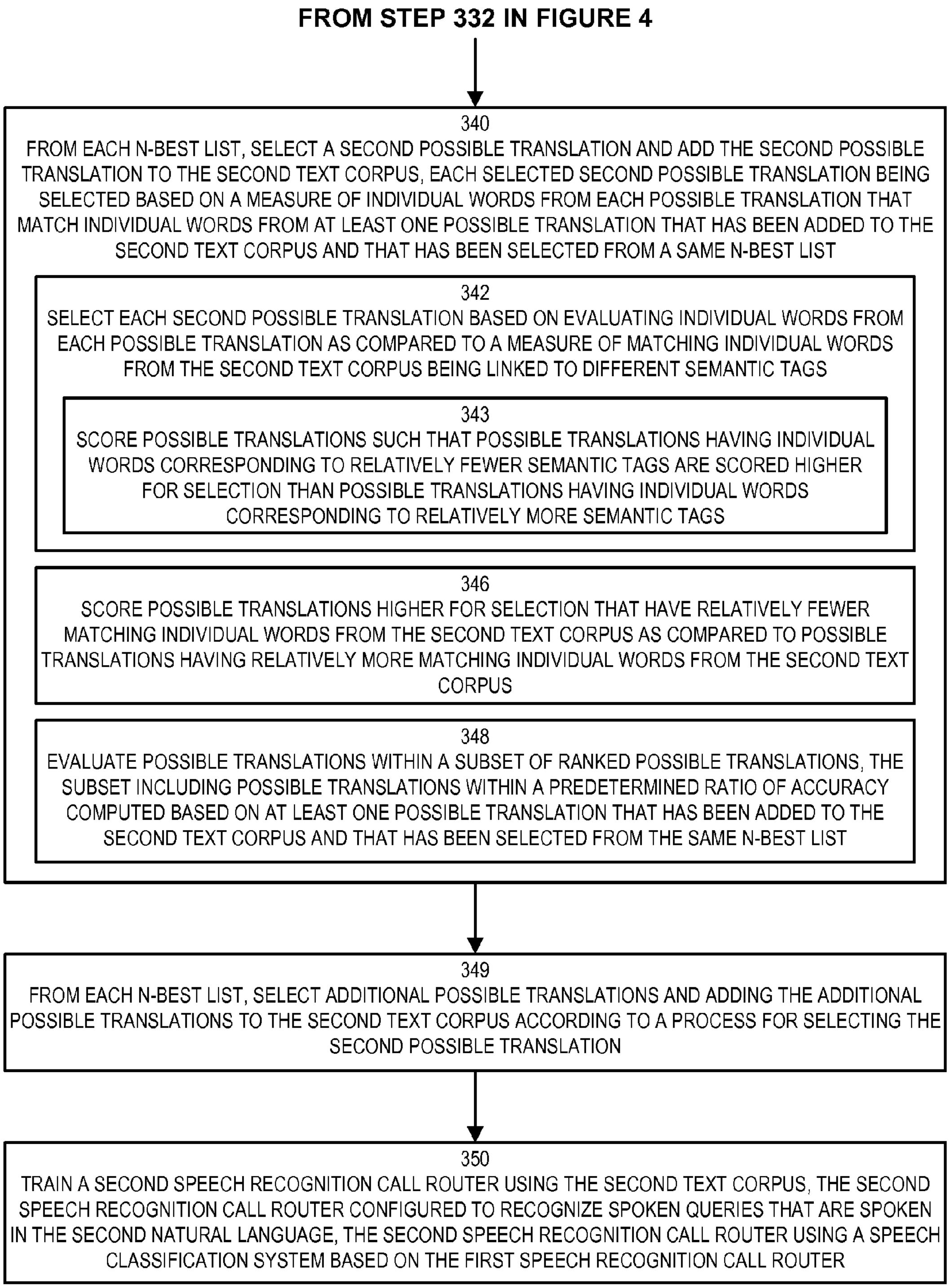
Figure 6:
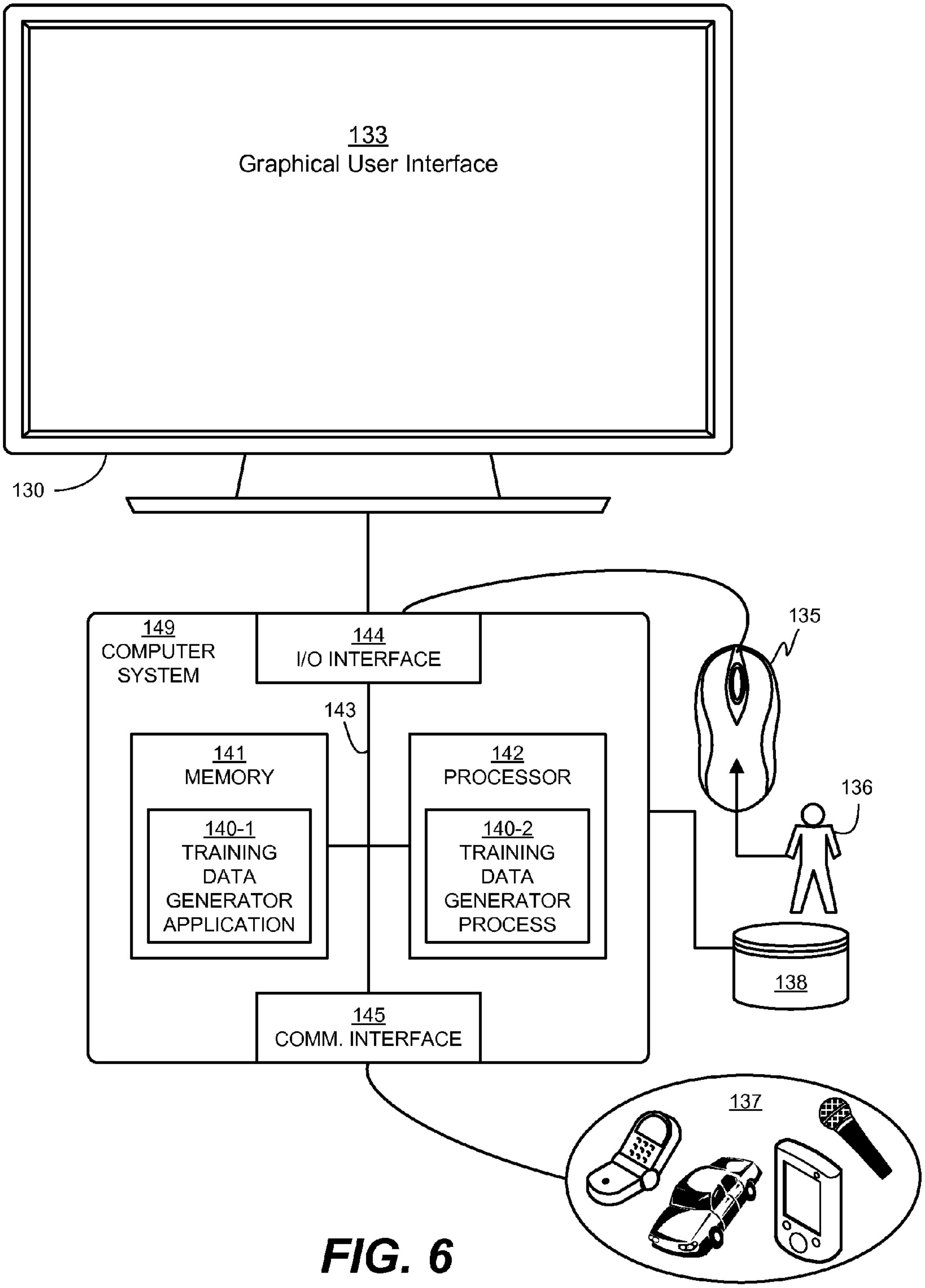
FIG. 6 is an example block diagram of a training data generator operating in a computer/network environment according to embodiments herein.

FIG. 6 illustrates an example block diagram of a training data generator 140 operating in a computer/network environment according to embodiments herein. In summary, FIG. 6 shows computer system 149 displaying a graphical user interface 133 that provides a training data generator interface. Computer system hardware aspects of FIG. 5 will be described in more detail following a description of the flow charts.

Functionality associated with training data generator 140 will now be discussed via flowcharts and diagrams in FIG. 3 through FIG. 5. For purposes of the following discussion, the training data generator 140 or other appropriate entity performs steps in the flowcharts.

Figure 3:
FIG. 3 is a flowchart illustrating an example of a process supporting a training data generator according to embodiments herein.

Now describing embodiments more specifically, FIG. 3 is a flow chart illustrating embodiments disclosed herein. In step 310, the training data generator 140 accesses a first text corpus. The first text corpus includes transcribed utterances that have been transcribed from spoken queries spoken in a first natural language. Each transcribed utterance is linked to a semantic tag that a first speech recognition call router uses to route telephone calls. For example, a database or index can associate each transcribed utterance with a specific semantic tag that represents a meaning or intent of a group of spoken utterances. Thus, the training data generator accesses or otherwise receives a set of transcribed utterances, that is, individual text strings. Any given text string can be a query, statement, phrase, etc. For example, the spoken queries could have been recorded from telephone callers, or recorded from a survey session.

In step 320, the training data generator translates the transcribed utterances from the first natural language to a second natural language via a machine translation process. This can be any conventional software process that automatically translates text from one language to another. The machine translation process generates an N-best list of possible translations for each transcribed utterance that is processed by the machine translation process. Each possible translation has a machine translation score that indicates a probability of being a correct translation. The N-best list can be an ordered list based on confidence levels of the translation. Each possible translation is linked to a semantic tag from a corresponding transcribed utterance (source transcribed utterance). By knowing or identifying a semantic tag already associated with the source transcribed utterance, the training data generator can link this semantic tag to each possible translation that represents a translation of that source transcribed utterance.

In step 330, from each N-best list, the training data generator selects a 1-best possible translation and adds that 1-best translation to a second text corpus. Each selected 1-best translation has a highest machine translation score as compared to machine translation scores of other possible translations within a respective N-best list. Such a selection is part of a first phase that selects translations to add to the second corpus based only on machine translation accuracy scores.

In step 340, from each N-best list, the training data generator selects a second possible translation and adds this second possible translation to the second text corpus. Each selected second possible translation is selected based on a measure of individual words from each possible translation that match individual words from at least one possible translation that has been added to the second text corpus and that has been selected from a same N-best list. Note that by evaluating or comparing to the translation (or translations) already added to the second text corpus and with this translation (or these translations) selected and added from the same N-best list, the training data generator looks for unseen words from translations associated with the second possible translation, instead of evaluating the entire second text corpus (all translations added to the second text corpus). Thus, translations having been added from the same N-best list means that just translations corresponding to the possible translation currently being processed are compared to identify unseen words in the possible translation. The training data generator selects an additional translation from a given N-best list to add to the second text corpus based on salience of a translation. That is, based on an accumulated salience of words that do not appear in the selected translations (to this point) of the source transcribed utterance. Thus, a given selected second possible translation typically has several words not yet found in selected translations of the source transcribed utterance.

In step 350, the training data generator trains a second speech recognition call router using the second text corpus, or otherwise provides the newly translated and collected set of translations and associated semantic tags for call router training. The second speech recognition call router can be configured to recognize spoken queries that are spoken in the second natural language, that is, the call router using a speech recognizer for a different language than that of the first call router. The second speech recognition call router uses a speech classification system based on the first speech recognition call router. The speech classification system can be copied straight from the first call router, or can use the same basic hierarchy with some modifications.

Figure 4:
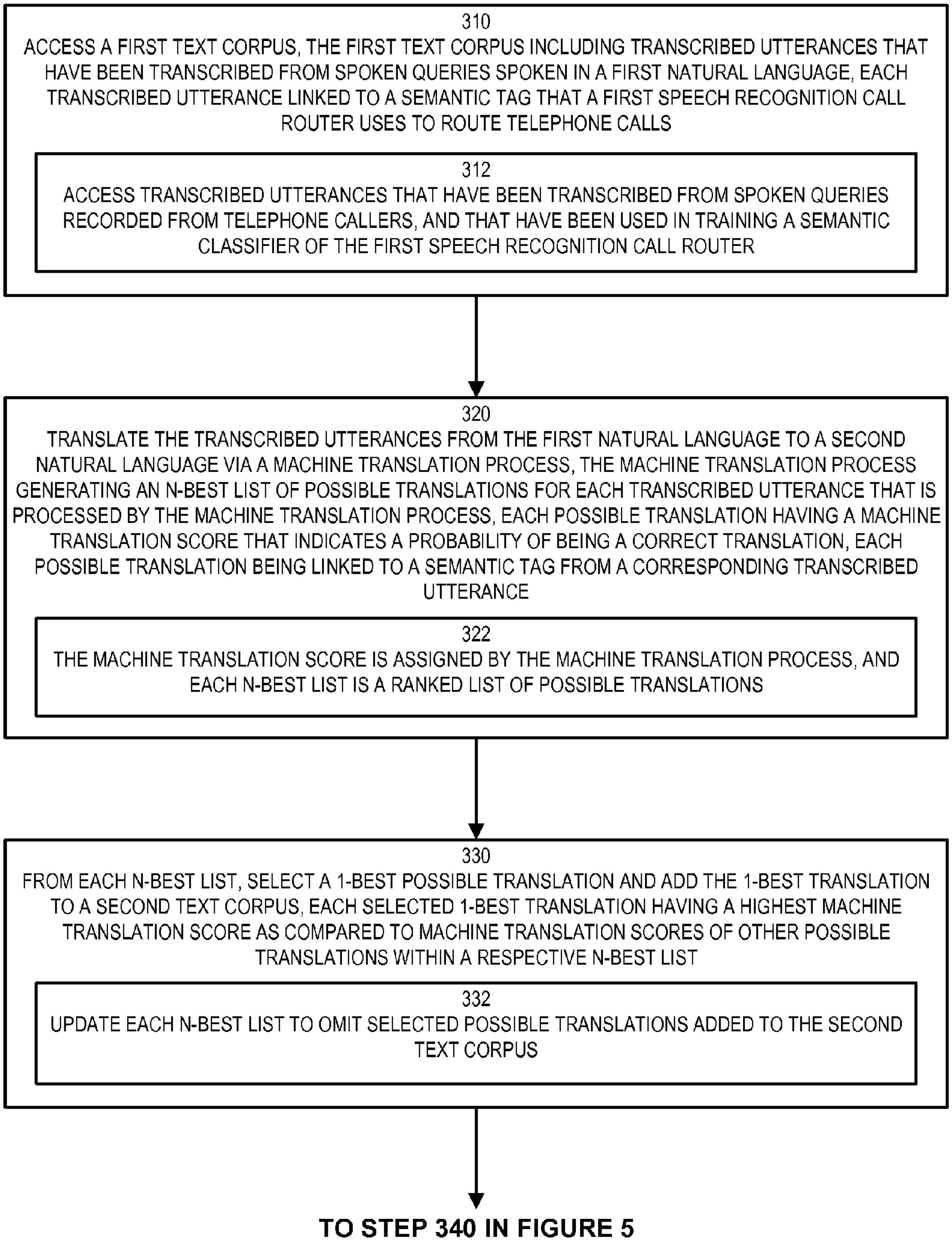
FIGS. 4-5 are a flowchart illustrating an example of a process supporting a training data generator according to embodiments herein.

FIGS. 4-5 include a flow chart illustrating additional and/or alternative embodiments and optional functionality of the training data generator 140 as disclosed herein.

In step 310, the training data generator 140 accesses a first text corpus. The first text corpus includes transcribed utterances that have been transcribed from spoken queries spoken in a first natural language. Each transcribed utterance is linked to a semantic tag that a first speech recognition call router uses to route telephone calls.

In step 312, the training data generator access transcribed utterances that have been transcribed from spoken queries recorded from telephone callers. For example, callers to a bank or utility company are recorded and their queries are extracted. Such transcribed utterances have been used in training a semantic classifier of the first speech recognition call router.

In step 320, the training data generator translates the transcribed utterances from the first natural language to a second natural language via a machine translation process. The machine translation process generates an N-best list of possible translations for each transcribed utterance that is processed by the machine translation process. Each possible translation has a machine translation score that indicates a probability of being a correct translation. Each possible translation is linked to a semantic tag from a corresponding transcribed utterance (source transcribed utterance).

In step 322, the machine translation score can be assigned by the machine translation process, and each N-best list is a ranked list of possible translations. Machine translation systems typically use a statistical translation process. As such, these statistics can be used not only to return a possible translation, but also an accompanying level of confidence representing a measure of accuracy.

In step 330, from each N-best list, the training data generator selects a 1-best possible translation and adds that 1-best translation to a second text corpus. Each selected 1-best translation has a highest machine translation score as compared to machine translation scores of other possible translations within a respective N-best list.

In step 332, the training data generator updates each N-best list to omit selected possible translations added to the second text corpus. For example, after selecting and adding the 1-best translation, the N-best list omits this translation when selecting a next translation to add to the second text corpus. Likewise, after the second possible translation is added to the second text corpus, this second selected translation is omitted from the N-best list or omitted from consideration when evaluating candidate translations for a third, forth, fifth, etc., selection.

In step 340, from each N-best list, the training data generator selects a second possible translation and adds this second possible translation to the second text corpus. Each selected second possible translation is selected based on a measure of individual words from each possible translation that match individual words from at least one possible translation that has been added to the second text corpus and that has been selected from a same N-best list. The training data generator selects an additional translation from a given N-best list to add to the second text corpus based on salience of a translation.

In step 342, the training data generator selects each second possible translation based on evaluating individual words from each possible translation as compared to a measure of matching individual words, from the second text corpus, being linked to different semantic tags. In other words, the training data generator also bases translation selection on Word Salience, that is, the inverse of the number of routes associated with a given word. Thus, if a candidate translation has several words that are not associated with very many routes, then this candidate translation is scored or weighted higher meaning the candidate translation is more likely to be selected for the second text corpus.

In step 343, the training data generator scores possible translations such that possible translations having individual words corresponding to relatively fewer semantic tags are scored higher for selection than possible translations having individual words corresponding to relatively more semantic tags. Thus, candidate translations have words associated with few routes are scored higher. Candidate translations that have words associated with no routes can be scored even higher.

In step 346, the training data generator scores possible translations higher (for selection) that have relatively fewer matching individual words from the second text corpus as compared to possible translations having relatively more matching individual words from the second text corpus. Thus, translations having more words not seen from corresponding selected transcribed utterances, are more likely to be selected themselves. In other words, with candidate translations having a word or several words identified as having no match in an associated portion of the second text corpus (not found in corresponding selected translations), the training data generator scores such candidate translations higher. Thus, candidate translations having words not yet seen in previously selected translations will be more likely to be selected for addition to the second text corpus.

In step 348, the training data generator evaluates possible translations within a subset of ranked possible translations. This subset includes possible translations within a predetermined ratio of accuracy computed based on at least one possible translation that has been added to the second text corpus and that has been selected from the same N-best list. In other words, the training data generator evaluates candidate translations from within a window or group of possible translations from the N-best list, thereby excluding possible translations having a machine translation score deemed too low for consideration.

In step 349, from each N-best list, the training data generator selects additional possible translations and adds the additional possible translations to the second text corpus according to a process for selecting the second possible translation. In other words, after a second translation has been selected from each N-best list, the training data generator can repeat the selection process for one or more additional evaluation and selection rounds.

In step 350, the training data generator trains a second speech recognition call router using the second text corpus, or otherwise provides the newly translated and collected set of translations and associated semantic tags for call router training. The second speech recognition call router can be configured to recognize spoken queries that are spoken in the second natural language, that is, the call router using a speech recognizer for a different language than that of the first call router. The second speech recognition call router uses a speech classification system based on the first speech recognition call router.

The training data generator can add the additional possible translations to the second text corpus until a predetermined number of translations for each source transcribed utterance have been added to the second corpus. For example, the system can be configured to generate seven translation variations for each source transcribed utterance/sentence.

Other embodiments for generating training data for call routing include the training data generator accessing or acquiring a first text corpus of transcribed utterances. Each transcribed utterance being linked to a semantic tag, such as from a first call router, or based on a first call router.

The transcribed utterances are then translated from a first natural language to a second natural language via a machine translation process. The machine translation process generates a list of translations for each transcribed utterance and assigns a machine translation accuracy score to each translation. These translations are inherently possible or potential translations in that they may be correct, partially correct, or not very correct. Each translation is linked to a semantic tag from a corresponding transcribed utterance. In essence, the semantic tag (call route) is copied over from the source transcribed utterance.

From each list, the training data generator selects a 1-best translation and adds the 1-best translation to a second text corpus. The 1-best translation is identified based on machine translation accuracy scores, such as a highest score.

From each list, the training data generator selects a second translation and adds the second translation to the second text corpus. Each selected second translation is selected based on an inverse number of routes linked to a given word in the second text corpus, that is, based on word salience. This can include scoring translations higher for selection that have words linked to fewer semantic tags in the second text corpus as compared to other translations from a same list.

Each selected second translation can also be selected based on a measure of absence of matching words between the second translation and one or more corresponding selected translations from the second text corpus, that is, based on salience of a translation. This can include scoring translations higher for selection that have more words not found in the one or more corresponding selected translations from the second text corpus.

Each selected second translation can also be selected from within a subset of translations of each list of translations. This subset can be determined based on the machine translation accuracy scores. For example, the subset can be determined to include translations having machine translation accuracy scores within a predetermined ratio of accuracy as compared to the 1-best translation.

The training data generator can then train a speech recognition call router in the second language using the second text corpus.

Continuing with FIG. 6, the following discussion provides a basic embodiment indicating how to carry out functionality associated with the training data generator 140 as discussed above. It should be noted, however, that the actual configuration for carrying out the training data generator 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, tablet computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the training data generator 140 of computer system 149 to communicate over a network and, if necessary, retrieve any data required to create views, process content, communicate with a user, etc. according to embodiments herein.

As shown, memory system 141 is encoded with training data generator 140-1 that supports functionality as discussed above and as discussed further below. Training data generator 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the training data generator 140-1. Execution of the training data generator 140-1 produces processing functionality in training data generator process 140-2. In other words, the training data generator process 140-2 represents one or more portions of the training data generator 140 performing within or upon the processor 142 in the computer system 149.

It should be noted that, in addition to the training data generator process 140-2 that carries out method operations as discussed herein, other embodiments herein include the training data generator 140-1 itself (i.e., the un-executed or non-performing logic instructions and/or data). The training data generator 140-1 may be stored on a non-transitory, tangible computer-readable storage medium including computer readable storage media such as floppy disk, hard disk, optical medium, etc. According to other embodiments, the training data generator 140-1 can also be stored in a memory type system such as in firmware, read only memory (ROM), or, as in this example, as executable code within the memory system 141.

In addition to these embodiments, it should also be noted that other embodiments herein include the execution of the training data generator 140-1 in processor 142 as the training data generator process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for generating training data for call routing, the computer-implemented method comprising:

accessing a first text corpus, the first text corpus including transcribed utterances that have been transcribed from spoken queries spoken in a first natural language, each transcribed utterance linked to a semantic tag that a first speech recognition call router uses to route telephone calls;

translating the transcribed utterances from the first natural language to a second natural language via a machine translation process, the machine translation process generating an N-best list of possible translations for each transcribed utterance that is processed by the machine translation process, each possible translation having a machine translation score that indicates a probability of being a correct translation, each possible translation being linked to a semantic tag from a corresponding transcribed utterance;

from each N-best list, selecting a 1-best possible translation and adding the 1-best translation to a second text corpus, each selected 1-best translation having a highest machine translation score as compared to machine translation scores of other possible translations within a respective N-best list;

from each N-best list, selecting a second possible translation and adding the second possible translation to the second text corpus, each selected second possible translation being selected based on a measure of individual words from each possible translation that match individual words from at least one possible translation that has been added to the second text corpus and that has been selected from a same N-best list; and training a second speech recognition call router using the second text corpus, the second speech recognition call router configured to recognize spoken queries that are spoken in the second natural language, the second speech recognition call router using a speech classification system based on the first speech recognition call router.

2. The computer-implemented method of claim 1, wherein selecting the second possible translation includes selecting each second possible translation based on evaluating individual words from each possible translation as compared to a measure of matching individual words from the second text corpus being linked to different semantic tags.

3. The computer-implemented method of claim 2, wherein selecting each second possible translation based on evaluating individual words from each possible translation as compared to the measure of matching individual words from the second text corpus being linked to different semantic tags includes scoring possible translations such that possible translations having individual words corresponding to relatively fewer semantic tags are scored higher for selection than possible translations having individual words corresponding to relatively more semantic tags.

4. The computer-implemented method of claim 1, wherein each selected second possible translation being selected based on a measure of individual words from each possible translation that match individual words from at least one possible translation that has been added to the second text corpus and that has been selected from a same N-best list includes scoring possible translations higher for selection that have relatively fewer matching individual words from the second text corpus as compared to possible translations having relatively more matching individual words from the second text corpus.

5. The computer-implemented method of claim 1, wherein, selecting the second possible translation includes evaluating possible translations within a subset of ranked possible translations, the subset including possible translations within a predetermined ratio of accuracy computed based on at least one possible translation that has been added to the second text corpus and that has been selected from the same N-best list.

6. The computer-implemented method of claim 1, further comprising:

from each N-best list, selecting additional possible translations and adding the additional possible translations to the second text corpus according to a process for selecting the second possible translation.

7. The computer-implemented method of claim 6, wherein selecting additional possible translations and adding the additional possible translations to the second text corpus includes adding additional translations until a predetermined number of translations for each transcribed utterance have been added to the second corpus.

8. The computer-implemented method of claim 1, further comprising:

updating each N-best list to omit selected possible translations added to the second text corpus.

9. The computer-implemented method of claim 1, wherein translating the transcribed utterances from the first natural language to the second natural language via a machine translation process includes the machine translation score being assigned by the machine translation process, and wherein each N-best list is a ranked list of possible translations.

10. The computer-implemented method of claim 1, wherein accessing the first text corpus includes accessing transcribed utterances that have been transcribed from spoken queries recorded from telephone callers, and that have been used in training a semantic classifier of the first speech recognition call router.

11. A computer-implemented method for generating training data for call routing, the computer-implemented method comprising:

accessing a first text corpus of transcribed utterances, each transcribed utterance being linked to a semantic tag;

translating the transcribed utterances from a first natural language to a second natural language via a machine translation process, the machine translation process generating a list of translations for each transcribed utterance and assigning a machine translation accuracy score to each translation, each translation being linked to a semantic tag from a corresponding transcribed utterance;

from each list, selecting a 1-best translation and adding the 1-best translation to a second text corpus, the 1-best translation identified based on machine translation accuracy scores;

from each list, selecting a second translation and adding the second translation to the second text corpus, each selected second translation being selected based on an inverse number of routes linked to a given word in the second text corpus; and training a speech recognition call router in the second language using the second text corpus.

12. The computer-implemented method of claim 11, wherein selecting, from each list, a second translation and adding the second translation to the second text corpus includes each selected second translation being selected based on a measure of absence of matching words between the second translation and one or more corresponding selected translations from the second text corpus.

13. The computer-implemented method of claim 12, wherein selecting, from each list, a second translation and adding the second translation to the second text corpus includes selecting the second translation from within a subset of translations of each list of translations, the subset determined based on the machine translation accuracy scores.

14. The computer-implemented method of claim 13, wherein each selected second translation being selected based on an inverse number of routes linked to a given word in the second text corpus includes scoring translations higher for selection that have words linked to fewer semantic tags in the second text corpus as compared to other translations from a same list.

15. The computer-implemented method of claim 14, wherein each selected second translation being selected based on a measure of absence of matching words in one or more corresponding selected translations from the second text corpus includes scoring translations higher for selection that have more words not found in the one or more corresponding selected translations from the second text corpus.

16. The computer-implemented method of claim 15, wherein the subset determined based on the machine translation accuracy scores includes including translations having machine translation accuracy scores within a predetermined ratio of accuracy as compared to the 1-best translation.

17. A computer system for generating call routing training data, the computer system comprising:

a processor; and a memory coupled to the processor, the memory storing instructions that, when executed by the processor, cause the system to perform the operations of:

accessing a first text corpus, the first text corpus including transcribed utterances that have been transcribed from spoken queries spoken in a first natural language, each transcribed utterance linked to a semantic tag that a first speech recognition call router uses to route telephone calls;

translating the transcribed utterances from the first natural language to a second natural language via a machine translation process, the machine translation process generating an N-best list of possible translations for each transcribed utterance that is processed by the machine translation process, each possible translation having a machine translation score that indicates a probability of being a correct translation, each possible translation being linked to a semantic tag from a corresponding transcribed utterance;

from each N-best list, selecting a 1-best possible translation and adding the 1-best translation to a second text corpus, each selected 1-best translation having a highest machine translation score as compared to machine translation scores of other possible translations within a respective N-best list;

from each N-best list, selecting a second possible translation and adding the second possible translation to the second text corpus, each selected second possible translation being selected based on a measure of individual words from each possible translation that match individual words from at least one possible translation that has been added to the second text corpus and that has been selected from a same N-best list; and training a second speech recognition call router using the second text corpus, the second speech recognition call router configured to recognize spoken queries that are spoken in the second natural language, the second speech recognition call router using a speech classification system based on the first speech recognition call router.

18. The computer system of claim 17, wherein selecting the second possible translation includes selecting each second possible translation based on evaluating individual words from each possible translation as compared to a measure of matching individual words from the second text corpus being linked to different semantic tags.

19. The computer system of claim 18, wherein selecting each second possible translation based on evaluating individual words from each possible translation as compared to the measure of matching individual words from the second text corpus being linked to different semantic tags includes scoring possible translations such that possible translations having individual words corresponding to relatively fewer semantic tags are scored higher for selection than possible translations having individual words corresponding to relatively more semantic tags.

20. The computer system of claim 17, wherein each selected second possible translation being selected based on a measure of individual words from each possible translation that match individual words from at least one possible translation that has been added to the second text corpus and that has been selected from a same N-best list includes scoring possible translations higher for selection that have relatively fewer matching individual words from the second text corpus as compared to possible translations having relatively more matching individual words from the second text corpus; and wherein, selecting the second possible translation includes evaluating possible translations within a subset of ranked possible translations, the subset including possible translations within a predetermined ratio of accuracy computed based on at least one possible translation that has been added to the second text corpus and that has been selected from the same N-best list.

* * * * *